(12) United States Patent
French et al.

(10) Patent No.: US 11,373,814 B2
(45) Date of Patent: Jun. 28, 2022

(54) MECHANICAL INTERLOCK FOR SWITCH

(71) Applicant: EATON INTELLIGENT POWER LIMITED, Dublin (IE)

(72) Inventors: Christopher French, Greenwood, SC (US); Daniel Sims, Newberry, SC (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 16/728,252

(22) Filed: Dec. 27, 2019

(65) Prior Publication Data

US 2021/0202189 A1    Jul. 1, 2021

(51) Int. Cl.
*H01H 9/20* (2006.01)
*H02B 13/00* (2006.01)

(52) U.S. Cl.
CPC .............. *H01H 9/20* (2013.01); *H02B 13/00* (2013.01)

(58) Field of Classification Search
CPC .......... H01H 9/28; H01H 9/281; H01H 9/282; H01H 9/283; H01H 9/286; H01H 9/20; H02B 13/00

USPC ...................................................... 200/50.01
See application file for complete search history.

(56) References Cited

U.S. PATENT DOCUMENTS

| 5,717,178 | A  | * | 2/1998  | Turner .................. | H01H 9/283 200/50.01 |
| 6,703,572 | B1 | * | 3/2004  | Broghammer ......... | H01H 9/282 200/43.11 |
| 9,496,101 | B2 | * | 11/2016 | Oneufer ................ | H01H 9/161 |
| 2014/0165384 | A1 | * | 6/2014 | Dudgeon ............... | H01H 9/283 29/622 |
| 2019/0371541 | A1 | * | 12/2019 | Riepe ................. | H01H 71/1054 |

* cited by examiner

*Primary Examiner* — Lheiren Mae A Caroc
(74) *Attorney, Agent, or Firm* — Squire Patton Boggs (US) LLP

(57) ABSTRACT

A mechanical interlock for a switch gear switch. The mechanical interlock includes a base and a slider. The slider is moveable relative to the base between a first position and a second position. The mechanical interlock is configured to lock the position of the switch when the slider is in the second position.

20 Claims, 7 Drawing Sheets

MECHANICAL INTERLOCK FOR SWITCH

FIELD OF INVENTION

This disclosure relates to electrical switchgear and, more particularly, to a mechanical interlock for a switchgear switch.

BACKGROUND

Electrical switchgear is a centralized collection of circuit breakers, fuses, switches, or other circuit protection devices that are configured to protect, control, and isolate electrical equipment. Switchgear may provide control and protection of electrical power equipment and circuits in industrial, commercial, and utility installations that involve generators, motors, feeder circuits, and transmission and distribution lines.

Switchgear may be equipped with a three-position switch to allow for equipment maintenance. The three positions of the three-position switch are closed, open, and grounded. The switchgear may include a user interface on an exterior surface of the switchgear that is connected to the working components of the switch via mechanical linkage. An operator may interact with the user interface to move the switch between the closed, open, and grounded positions.

During certain operations it may be desirable to prevent the switch from moving between positions. In certain switchgear, the only know means for preventing movement of the switch between positions involves providing a cover over the user interface. Such arrangement, however, does not physically prevent the switch from moving between positions but, rather, only prevents manipulation of the user interface.

SUMMARY OF THE INVENTION

In one embodiment a mechanical interlock for a switchgear switch includes a base that includes a lockout extension having a shackle receiving hole. The mechanical interlock further includes a slider that includes a main portion having a first end and a second end opposite the first end, a locking finger at the first end of the main portion, a hasp portion at the second end of the main portion, and a lockout extension aperture at the junction of the main portion and the hasp portion. The slider is moveable relative to the base between a first position and a second position. The locking finger is configured to be disengaged with mechanical linkage of the switch when the slider is in the first position. The locking finger is configured to engage with mechanical linkage of the switch when the slider is in the second position to lock a position of the switch. The shackle receiving hole is covered when the slider is in the first position and exposed when the slider is in the second position. The shackle receiving hole is configured to receive a shackle of a padlock when the slider is in the second position to lock the slider in the second position.

In another embodiment a mechanical interlock for a switchgear switch includes a base having a first deadbolt aperture. The mechanical interlock further includes a slider that includes a main portion having a first end and a second opposite end, a locking finger at the first end of the main portion, and a second deadbolt aperture adjacent the locking finger. The slider is moveable relative to the base between a first position and a second position. The locking finger is configured to be disengaged with mechanical linkage of the switch when the slider is in the first position. The locking finger is configured to engage with mechanical linkage of the switch when the slider is in the second position to lock the position of the switch. The first deadbolt aperture and the second deadbolt aperture are not aligned when the slider is in the first position and are aligned when the slider is in the second position. The first deadbolt aperture and the second deadbolt aperture are configured to receive a locking bolt of a deadbolt when the slider is in the second position to lock the slider in the second position.

In yet another embodiment, a mechanical interlock for a switchgear switch includes a base that includes a hole. The mechanical interlock further includes a slider that includes a locking finger. The slider is moveable relative to the base between a first position and a second position. The locking finger is configured to be disengaged with mechanical linkage of the switch when the slider is in the first position. The locking finger is configured to engage with mechanical linkage of the switch when the slider is in the second position to lock a position of the switch. The mechanical interlock is configured such that a locking mechanism is prevented from engaging with the hole to lock the slider in the first position. The mechanical interlock is configured such that the locking mechanism is permitted to engage with the hole to lock the slider in the second position.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
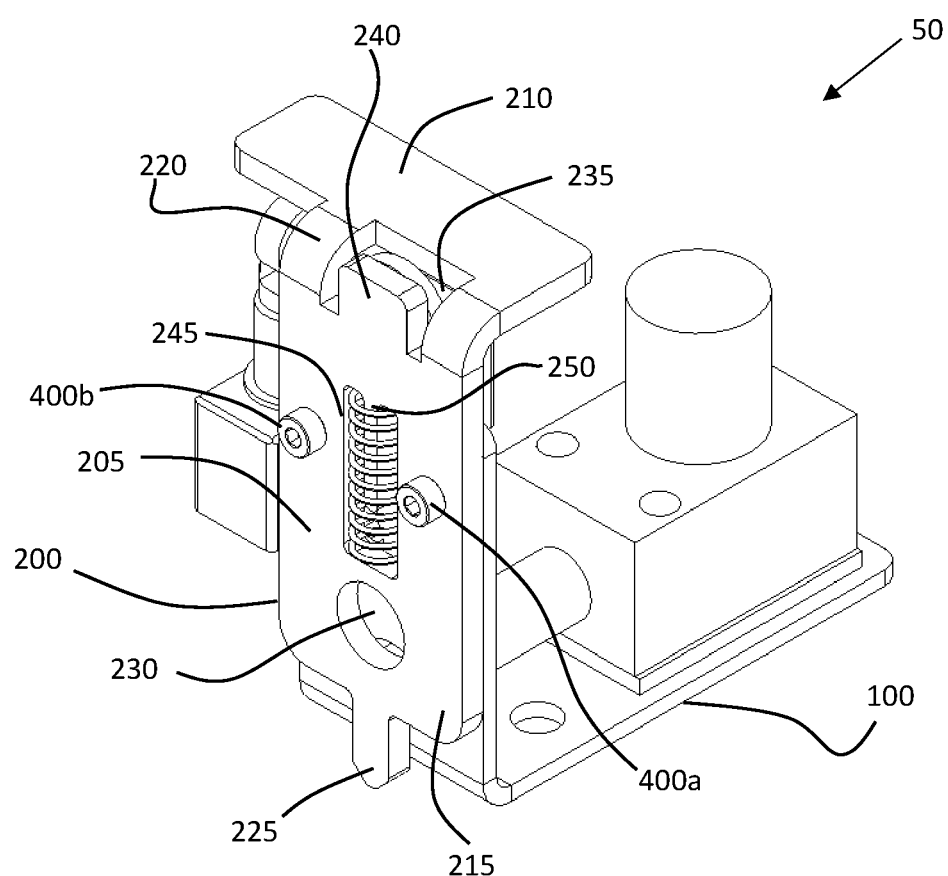
FIG. 1 is a front perspective view of one embodiment of a mechanical interlock for a switch when the mechanical interlock is in an unlocked position.
Figure 2:
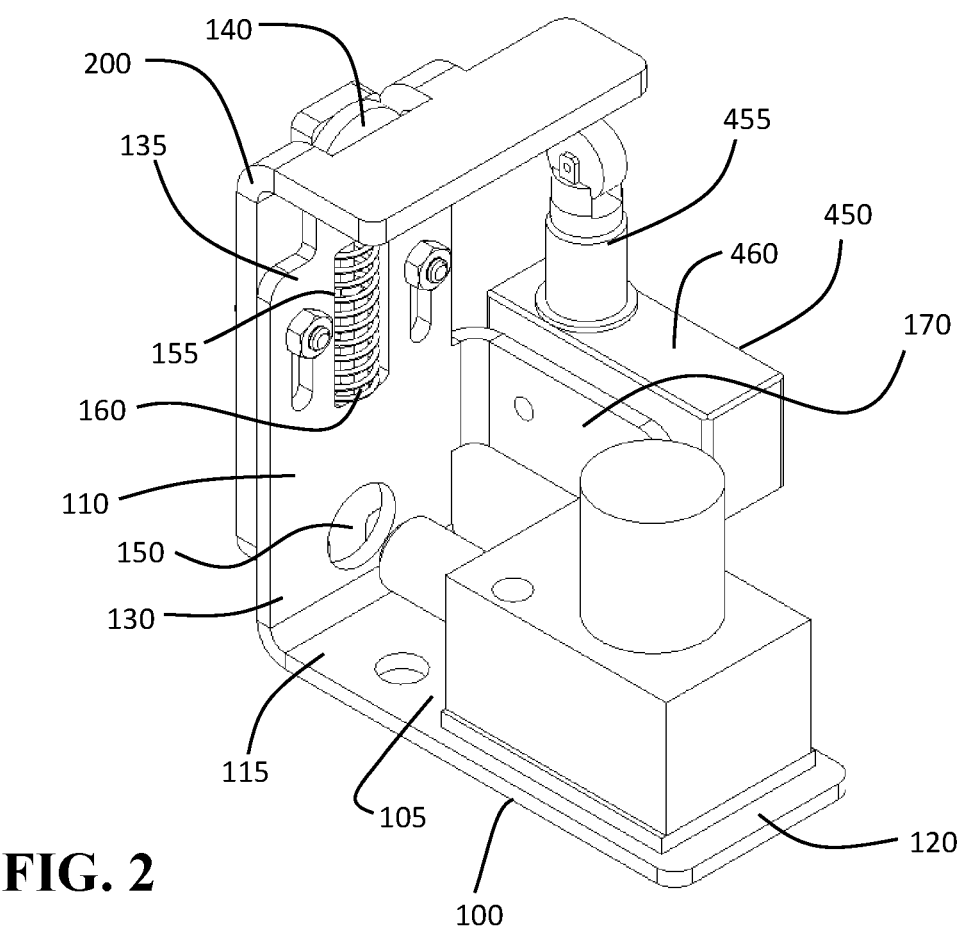
FIG. 2 is a rear perspective view of the mechanical interlock of FIG. 1 when the mechanical interlock is in an unlocked position.

FIGS. 1-5 show one embodiment of a mechanical interlock 50 for a switch. The mechanical interlock 50 may be installed on a switchgear (FIG. 5) and configured to prevent the physical movement of the switchgear switch between positions. The mechanical interlock 50 includes a base 100 and a slider 200.

In the illustrated embodiment, the base 100 is substantially L-shaped and includes a mounting portion 105 and a slider receiving portion 110. The mounting portion 105 is substantially rectangular shaped and extends between a first end 115 and a second end 120. In an alternative embodiment, the mounting portion may be any desired shape. In another alternative embodiment, the base and the mounting portion may be separate components that are connected to each other.

The mounting portion 105 is provided with four mounting holes 125 that are arranged to form a square. The mounting holes 125 are located midway between the first end 115 and the second end 120 of the mounting portion 105. In an alternative embodiment, the mounting portion may include any desired number of mounting holes arranged to form any desired shape at any desired location.

The slider receiving portion 110 is substantially rectangular shaped and extends between a first end 130 and a second end 135. In an alternative embodiment, the slider receiving portion 110 may be any desired shape. The slider receiving portion 110 extends in a plane that is substantially perpendicular to a plane in which the mounting portion 105 extends. The first end 130 of the slider receiving portion 110 is adjacent the first end 115 of the mounting portion 105.

The slider receiving portion 110 is provided with a lockout extension 140 at the second end 135. The lockout extension 140 includes a shackle receiving hole 145. The slider receiving portion 110 is also provided with a first deadbolt aperture 150 toward the first end 130. In an alternative embodiment, the slider receiving portion has a shackle receiving hole but lacks a deadbolt aperture. In another alternative embodiment, the slider receiving portion has a deadbolt aperture, but lacks a shackle receiving hole.

A first spring slot 155 is provided on the slider receiver portion 110. The first spring slot 155 is located between the lockout extension 140 and the first deadbolt aperture 150. The first spring slot 155 includes a first spring retainer 160. The first spring retainer 160 extends from a periphery of the first spring slot 155 away from the first end 130 of the slider receiving portion 110. First and second limiter slots 165a, 165b are provided on opposite sides of the first spring slot 155.

In the illustrated embodiment, the slider receiving portion 110 includes a status switch mount 170. The status switch mount 170 extends in a plane that is substantially perpendicular with both the plane the mounting portion 105 extends in and the plane the slider receiving portion 110 extends in. The status switch mount 170 extends from an edge of the slider receiving portion 110 between the first spring slot 155 and the first deadbolt aperture 150. In an alternative embodiment, the status switch mount may have any desired orientation at any desired location on the slider receiving portion, or any other part of the mechanical interlock. In another alternative embodiment, the status switch mount may be omitted.

Figure 6:
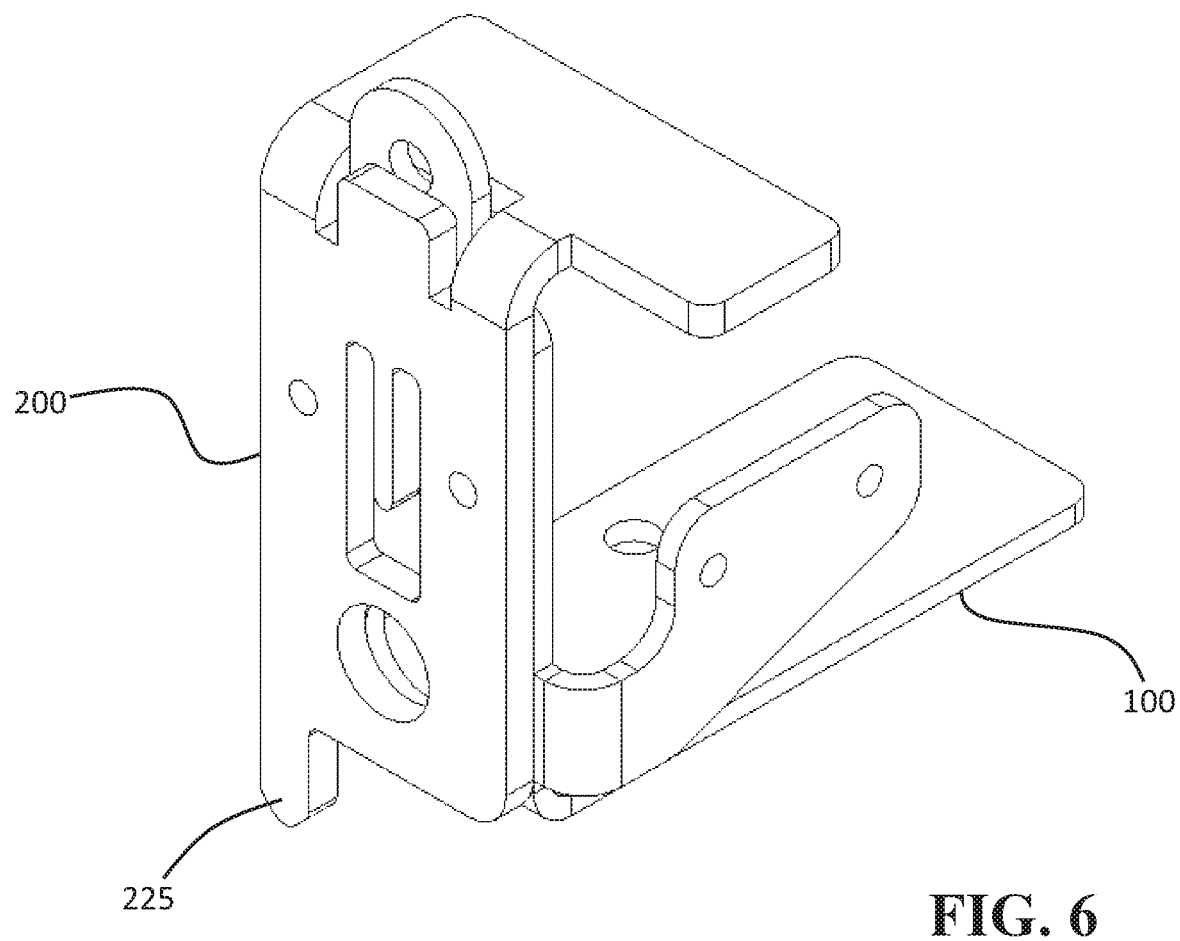
FIG. 6 is a front perspective view of an alternative embodiment of a part of the mechanical interlock of FIG. 1.

In the illustrated embodiment, the slider 200 is substantially L-shaped and includes a main portion 205 and a hasp portion 210. The main portion 205 is substantially rectangular shaped and extends between a first end 215 and a second end 220. In an alternative embodiment, the main portion may be any desired shape. The main portion 205 is provided with a locking finger 225 at the first end 215. In the embodiment of FIGS. 1-5, the locking finger 225 is centrally located at the first end 215 of the main portion 205. However, referring to FIG. 6, in an alternative embodiment of the slider 200, the locking finger 225 may be offset at the first end 215 of the main portion 205. In other alternative embodiments, the locking finger may be provided at any desired location. A second deadbolt aperture 230 is provided on the main portion 205 adjacent the locking finger 225.

The hasp portion 210 is provided at the second end 220 of the main portion 205. The hasp portion 210 extends in a plane that is substantially perpendicular to a plane in which the main potion 205 extends. The slider 200 is provided with a lockout extension aperture 235 at the junction of the main portion 205 and the hasp portion 210. The lockout extension aperture 235 includes a hole guard 240. The hole guard 240 extends from a periphery of the lockout extension aperture 235 away from the first end 215 of the main portion 205. In an alternative embodiment, the slider has a lockout extension aperture but lacks a deadbolt aperture, and is used with a slider receiving portion that likewise lacks a deadbolt aperture. In another alternative embodiment, the slider has a deadbolt aperture, but lacks a lockout extension aperture, and is used with a slider receiving portion that lacks an extension and a shackle receiving aperture.

A second spring slot 245 is provided on the main portion 205. The second spring slot 245 is located between the second deadbolt aperture 230 and the lockout extension aperture 235. The second spring slot 245 includes a second spring retainer 250. The second spring retainer 250 extends from a periphery of the second spring slot 245 away from the second end 220 of the main portion 205. The second spring retainer 250 is aligned with the first spring retainer 160 of the first spring slot 155. However, the first and second spring retainers 160, 250 extend from the periphery of the first and second spring slots 155, 245, respectively, at opposite ends of the respective slot. First and second limiter apertures 255a, 255b are provided on opposite sides of the second spring slot 245.

The slider 200 is attached to the base 100 such that the main portion 205 of the slider 200 is in sliding engagement with the slider receiving portion 110 of the base 100. The base 100 and the slider 200 cooperate to capture a spring 300 in the first and second spring slots 155, 245. The first spring retainer 160 extends into an interior space defined by the spring 300 at a first end 305 of the spring 300. The second spring retainer 250 extends into the interior space defined by the spring 300 at a second end 310 of the spring 300. Thus, the first and second spring retainers 160, 250 cooperate to retain the spring 300 in the first and second spring slots 155, 245.

First and second fasteners 400a, 400b are used to secure the base 100 and the slider 200 to one another. The first and second fasteners 400a, 400b each include a bolt 405 and a nut 410. In an alternative embodiment, the first and second fasteners may be any desired arrangement. The bolt 405 of the first fastener 400a extends through the first limiter aperture 255a and the first limiter slot 165a and is retained in place by a respective nut 410. The bolt 405 of the second fastener 400b extends through the second limiter aperture 255b and the second limiter slot 165b and is retained in place by a respective nut 410.

Figure 3:
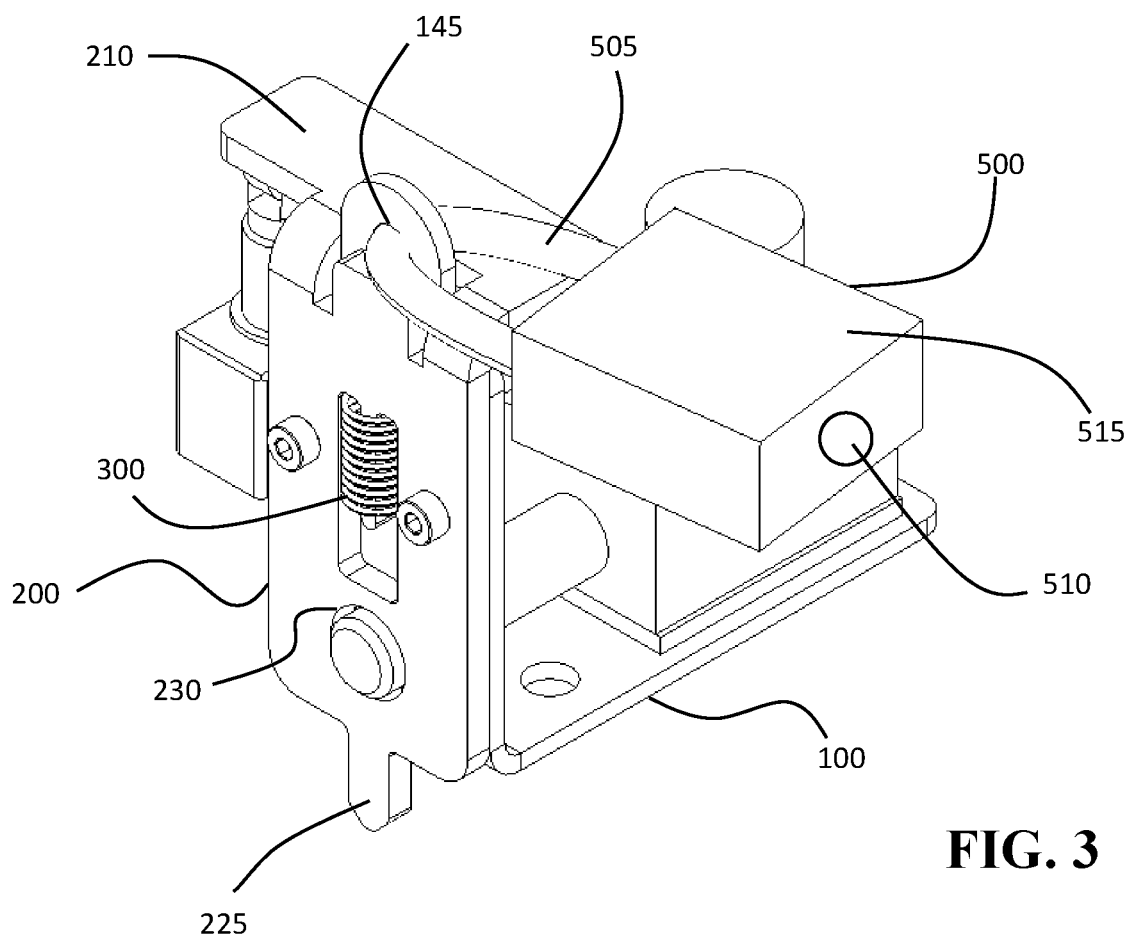
FIG. 3 is a front perspective view of the mechanical interlock of FIG. 1 when the mechanical interlock is in a locked position.
Figure 4:
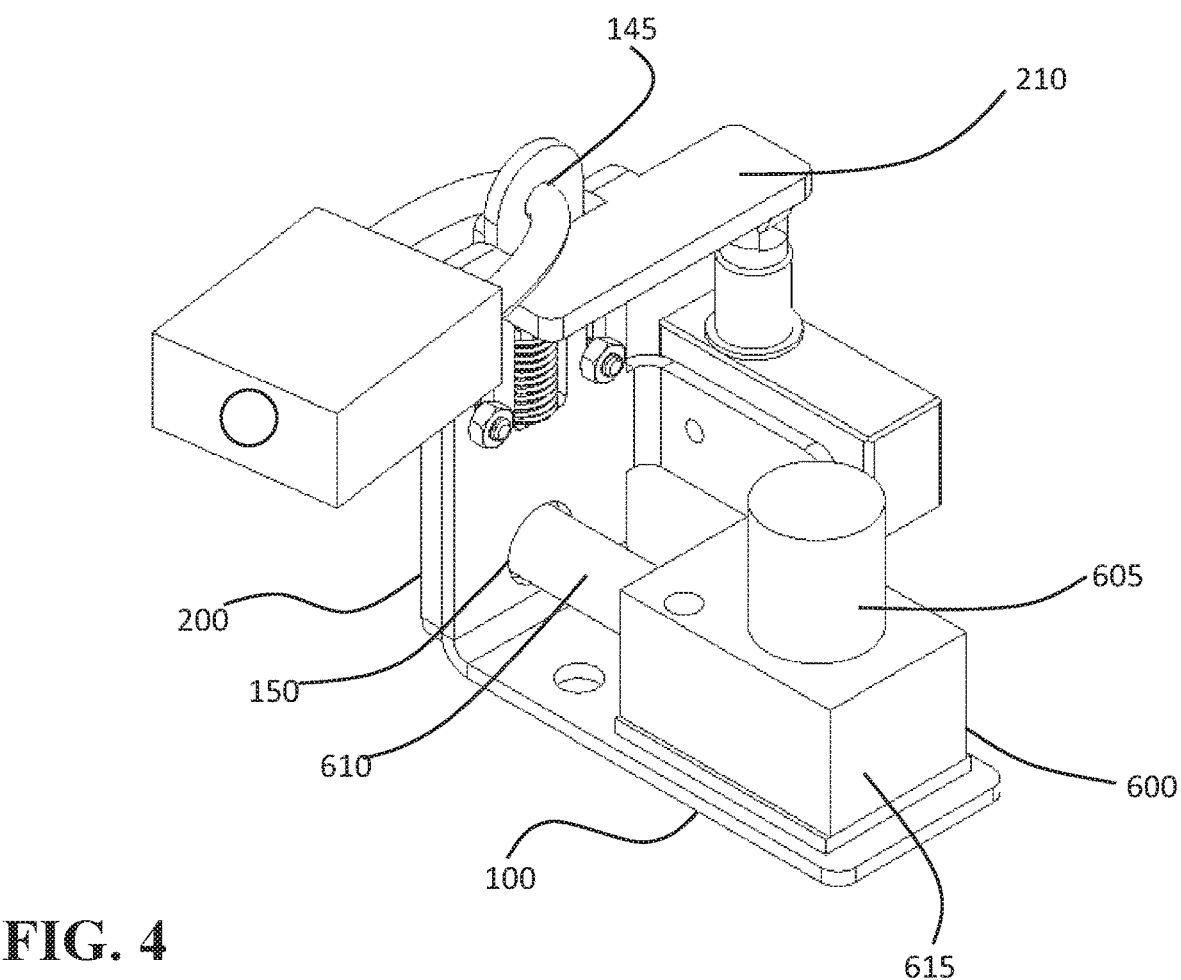
FIG. 4 is a rear perspective view of the mechanical interlock of FIG. 1 when the mechanical interlock is in the locked position.
Figure 5:
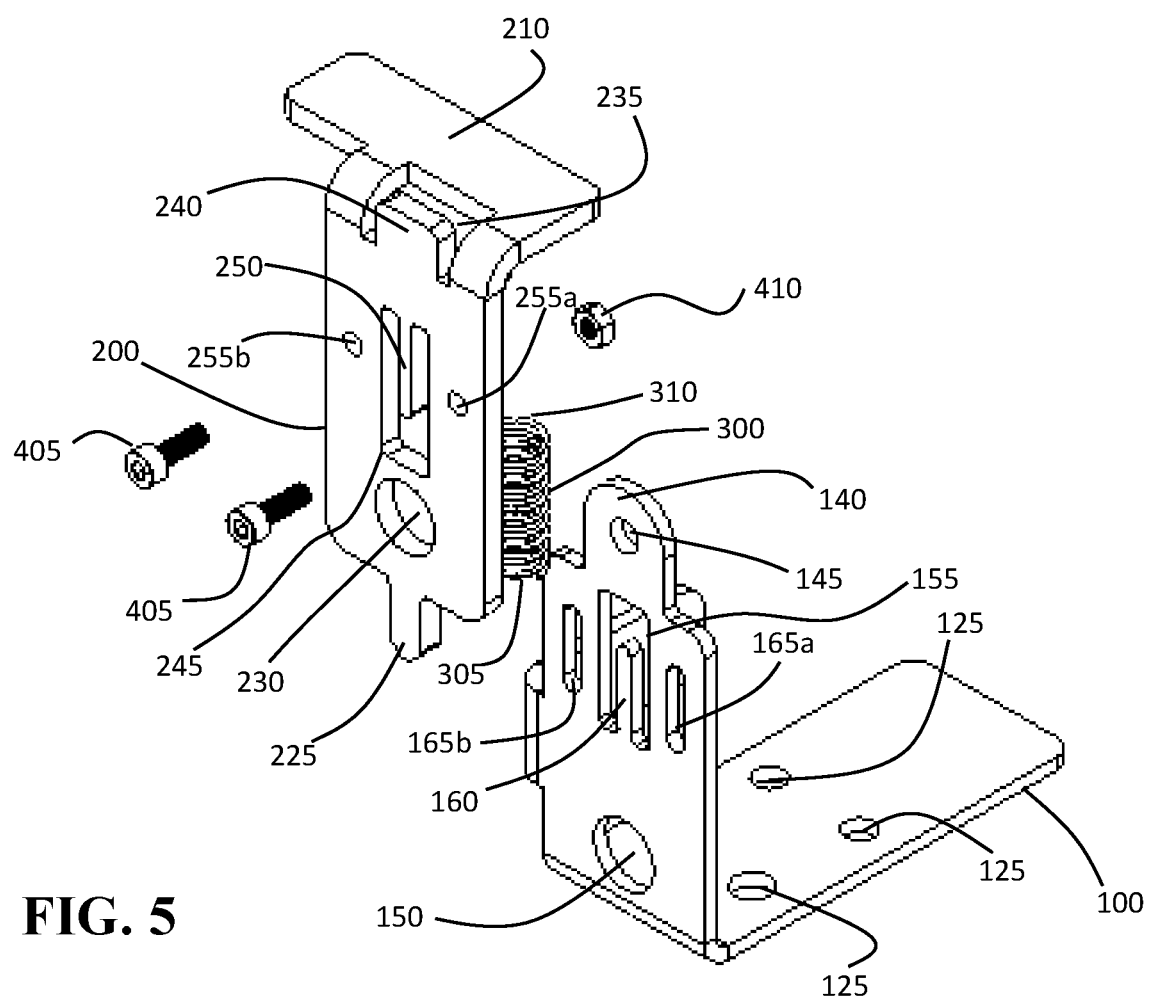
FIG. 5 is an exploded perspective view of the mechanical interlock of FIG. 1.

The slider 200 is moveable relative to the base 100 between a first position (FIGS. 1 and 2) and a second position (FIGS. 3 and 4). In the first position, the first deadbolt aperture 150 and the second deadbolt aperture 230 are not aligned with one another and the shackle receiving hole 145 is blocked by the hole guard 240. In the second position, the first deadbolt aperture 150 and the second deadbolt aperture 230 are aligned with one another and the hole guard 240 is moved to expose the shackle receiving hole 145. Travel of the bolts 405 of the first and second fasteners 400a, 400b between the ends of the first and second limiter slots 165a, 165b respectively, limits movement of the slider 200 relative to the base 100 between the first and second positons. The spring 300 is configured to bias the slider 200 toward the first position.

In the illustrated embodiment, a status switch 450 is mounted on the status switch mount 170. The status switch 450 includes a plunger 455 that is retained by a housing 460, which is in turn attached to the status switch mount 170. The status switch 450 is arranged such that, when the slider 200 is moved to the second position, the hasp portion 210 comes into engagement with and depresses the plunger 455. Depressing the plunger 455 causes the status switch 450 to signal that slider 200 is in the second position. While the figures show an electronic status switch, in alternative embodiments, the status switch may be a mechanical assembly connected to a flag or other notification component. In yet another alternative embodiment, the status switch may be omitted.

A locking mechanism may be used to lock the slider 200 in the second position. In the illustrated embodiment, the locking mechanism includes a padlock 500 and a deadbolt lock 600. In alternative embodiments, any desired locking mechanism may be used. The padlock 500 may include a shackle 505 and a locking mechanism 510 that are retained by a housing 515. A key (not shown) may be used to manipulate the locking mechanism 510 to unlock the padlock 500. As discussed above, the shackle receiving hole 145 is exposed when the slider 200 is in the second position. The shackle 505 may be inserted into the exposed shackle receiving hole 145 and the padlock 500 may then be locked to prevent removal. The padlock 500 may be part of a "lock out/tag out" system to prevent an electrical circuit from being inadvertently closed, or from being closed by an individual while one or more other individuals are performing maintenance on the system.

The spring 300 will tend to bias the slider 200 toward the first position. However, the 505 shackle will engage with the hasp portion 210 of the slider 200, thereby preventing the slider 200 from actually moving to the first position. Thus, the slider 200 is locked in the second position.

In the illustrated embodiment, the deadbolt 600 includes a cylinder 605 and a locking bolt 610 that are retained by a housing 615. A key (not shown) may be used to manipulate the cylinder 605 to cause the locking bolt 610 to move between an extended position and a retracted position. The housing 615 of the deadbolt 600 may be attached to the mounting portion 105 of the base 100 of the mechanical interlock 50. As discussed above, the first deadbolt aperture 150 and the second deadbolt aperture 230 are aligned with one another when the slider 200 is in the second position. The cylinder 605 may be manipulated to move the locking bolt 610 from the retracted position to the extended position. In the retracted position, the locking bolt 610 is withdrawn from the first and second deadbolt apertures 150, 230. In the extend position, the locking bolt 610 extends through the aligned first and second deadbolt apertures 150, 230. The deadbolt lock 600 may also be part of a "lock out/tag out" system to prevent an electrical circuit from being inadvertently closed, or from being closed by an individual while one or more other individuals are performing maintenance on the system.

The spring 300 will tend to bias the slider 200 toward the first position. However, the locking bolt 610 will engage with the periphery of the second deadbolt aperture 230, thereby preventing the slider 200 from actually moving to the first position. Thus, the slider 200 is locked in the second position.

The mechanical interlock 50 is configured to prevent the slider 200 from being locked in the first position. As discussed above, when the slider 200 is in the first position, the shackle receiving hole 145 is blocked by the hole guard 240, and the first deadbolt aperture 150 and the second deadbolt aperture 230 are not aligned with one another. Thus, when the slider is in the first position, the shackle 505 cannot be inserted into the shackle receiving hole 145 due to the hole guard 240, and the locking bolt 610 cannot be extended through the first and second deadbolt apertures 150, 230 due to the misalignment of the apertures. Consequently, it is not possible to lock the slider 200 in the first position. In an alternative embodiment, the mechanical interlock may be arranged such that the slider can be locked in the first position.

Figure 7:
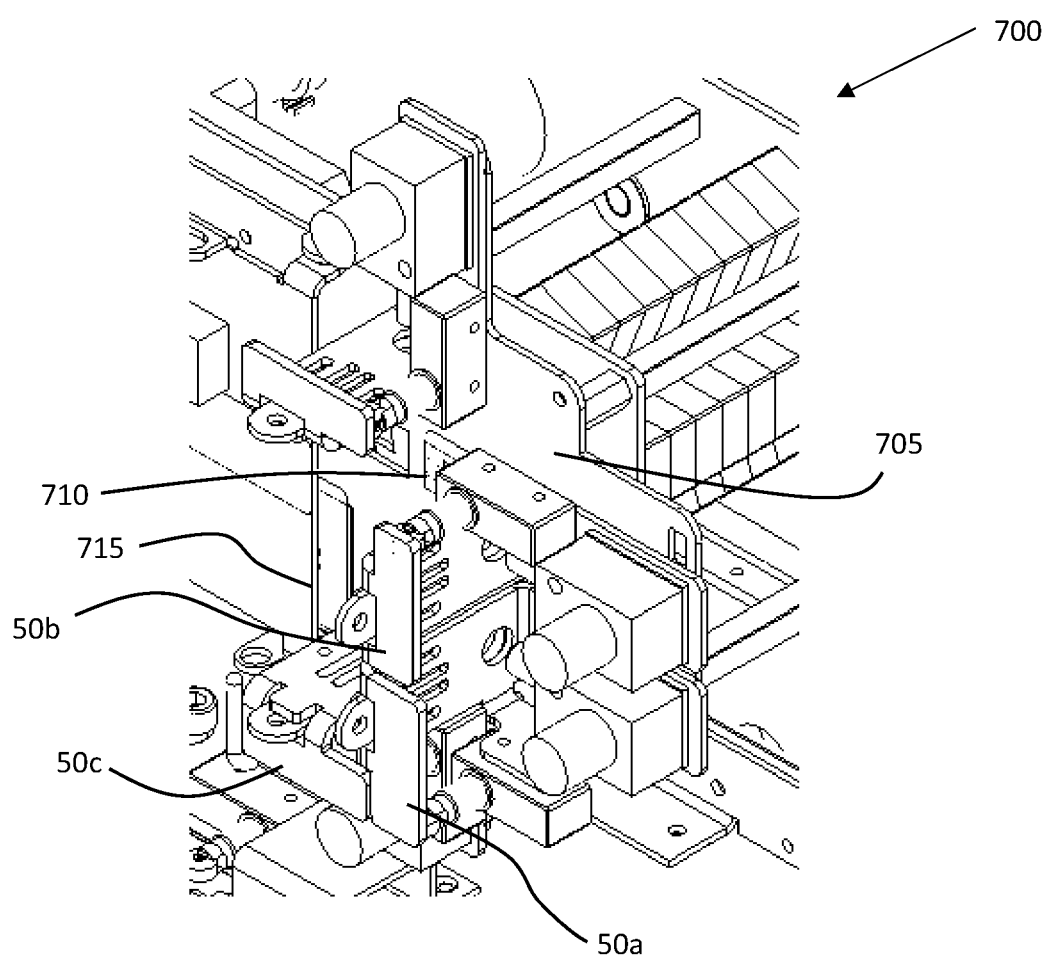
FIG. 7 is a view of a switchgear switch having a plurality of the mechanical interlocks of FIG. 1 installed on the switchgear switch.

FIG. 7 shows a switchgear 700 having a switch 715 equipped with a plurality of mechanical interlocks 50a, 50b, 50c, 50d. The switchgear 700 includes a housing 705 that contains the working components of the switchgear 700. A user interface 710 is provided on the housing. The user interface 710 is connected to the switch via mechanical linkage (not shown). In one example, the switch is a three-position switch that has a closed position, an open position, and a grounded position. As will now be explained, the mechanical interlocks 50a, 50b, 50c, 50d may lock the switch in a desired position.

The first mechanical interlock 50a corresponds to a "prevent ground" position. When the slider 200 of the first mechanical interlock 50a is moved to the second position, the locking finger 225 engages with the mechanical linkage of the switch 715 to prevent the switch from moving to the grounded position. The second mechanical interlock 50b corresponds to a "prevent close" position. When the slider 200 of the second mechanical interlock 50b is moved to the second position, the locking finger 225 engages with the mechanical linkage of the switch 715 to prevent the switch from moving to the closed position. The third mechanical interlock 50c corresponds to a "lock ground" position. When the slider 200 of the third mechanical interlock 50c is moved to the second position, the locking finger 225 engages with the mechanical linkage of the switch 715 to lock the switch in the grounded position. The fourth mechanical interlock 50d corresponds to a "lock close" position. When the slider 200 of the fourth mechanical interlock 50d is moved to the second position, the locking finger 225 engages with the mechanical linkage of the switch 715 to lock the switch in the closed position.

In alternative embodiments, less than four mechanical interlocks may be employed. For example, in some embodiments, mechanical interlocks may only be employed for "prevent close" and "prevent ground" positions. In other embodiments, only a single mechanical interlock may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A mechanical interlock for a switch of a switchgear comprising:
   a base including a lockout extension having a shackle receiving hole; and
   a slider including:
      a main portion having a first end and a second end opposite the first end;
      a locking finger at the first end of the main portion;
      a hasp portion at the second end of the main portion; and
      a lockout extension aperture at a junction of the main portion and the hasp portion; and
   wherein the slider is moveable relative to the base between a first position and a second position, the locking finger being configured to be disengaged with mechanical linkage of the switch when the slider is in the first position, the locking finger being configured to engage with mechanical linkage of the switch when the slider is in the second position to lock a position of the switch; and
   wherein, the shackle receiving hole is covered when the slider is in the first position and exposed when the slider is in the second position, the shackle receiving hole being configured to receive a shackle of a padlock when the slider is in the second position to lock the slider in the second position.

2. The mechanical interlock of claim 1 comprising a spring that is configured to bias the slider toward the first position.

3. The mechanical interlock of claim 2, wherein the base comprises a first spring slot and the slider comprises a second spring slot, the spring being captured in the first spring slot and the second spring slot.

4. The mechanical interlock of claim 3, wherein the first spring slot includes a first spring retainer and the second spring slot includes a second spring retainer, the first spring retainer and the second spring retainer extending into an interior space defined by the spring to retain the spring in the first and second spring slots.

5. The mechanical interlock of claim 1, wherein the base comprises a limiter slot and the slider comprises a limiter aperture, and wherein a fastener extends through the limiter slot and the limiter aperture to secure the base and the slider to one another, the fastener limiting movement of the slider relative to the base between the first and second positions.

6. The mechanical interlock of claim 1, wherein the lockout extension aperture includes a hole guard, the hole guard covering the shackle receiving hole when the slider is in the first position.

7. The mechanical interlock of claim 1, wherein at least one of the slider and the base is L-shaped.

8. The mechanical interlock of claim 1, wherein the locking finger is configured to directly engage with mechanical linkage of the switch when the slider is in the second position.

9. The mechanical interlock of claim 1, wherein the base comprises a mounting portion and a slider receiving portion, the lockout extension being provided on the slider receiving portion, the main portion of the slider engaging with the slider receiving portion, the mounting portion being configured for attachment to the switchgear.

10. The mechanical interlock of claim 1, wherein the base comprises a first deadbolt aperture and the slider comprises a second deadbolt aperture, and wherein the first deadbolt aperture and the second deadbolt aperture are not aligned when the slider is in the first position and are aligned when the slider is in the second position, the first deadbolt aperture and the second deadbolt aperture being configured to receive a locking bolt of a deadbolt when the slider is in the second position to lock the slider in the second position.

11. A mechanical interlock for a switch of a switchgear comprising:
   a base comprising a first deadbolt aperture; and
   a slider comprising:
      a main portion having a first end and a second opposite end;
      a locking finger at the first end of the main portion; and
      a second deadbolt aperture adjacent the locking finger;
   wherein the slider is moveable relative to the base between a first position and a second position, the locking finger being configured to be disengaged with mechanical linkage of the switch when the slider is in the first position, the locking finger being configured to engage with mechanical linkage of the switch when the slider is in the second position to lock the position of the switch; and
   wherein, the first deadbolt aperture and the second deadbolt aperture are not aligned when the slider is in the first position and are aligned when the slider is in the second position, the first deadbolt aperture and the second deadbolt aperture being configured to receive a locking bolt of a deadbolt when the slider is in the second position to lock the slider in the second position.

12. The mechanical interlock of claim 11 comprising a spring that is configured to bias the slider toward the first position.

13. The mechanical interlock of claim 12, wherein the base comprises a first spring slot and the slider comprises a second spring slot, the spring being captured in the first spring slot and the second spring slot.

14. The mechanical interlock of claim 13, wherein the first spring slot includes a first spring retainer and the second spring slot includes a second spring retainer, the first spring retainer and the second spring retainer extending into an interior space defined by the spring to retain the spring in the first and second spring slots.

15. The mechanical interlock of claim 11, wherein the base comprises a limiter slot and the slider comprises a limiter aperture, and wherein a fastener extends through the limiter slot and the limiter aperture to secure the base and the slider to one another, the fastener limiting movement of the slider relative to the base between the first and second positions.

16. The mechanical interlock of claim 11, wherein at least one of the slider and the base is L-shaped.

17. The mechanical interlock of claim 11, wherein the locking finger is configured to directly engage with mechanical linkage of the switch when the slider is in the second position.

18. The mechanical interlock of claim 11, wherein the base comprises a lockout extension having a shackle receiving hole and the slider comprises a lockout extension aperture, the lockout extension extending through the lockout extension aperture when the slider is in the second position, the shackle receiving hole being configured to receive a shackle of a padlock when the slider is in the second position to lock the slider in the second position.

19. The mechanical interlock of claim 18, wherein the slider comprises a main portion and a hasp portion, the lockout extension being provided at the junction of the main portion and the hasp portion, the base being in engagement with the main portion, the shackle engaging with the hasp portion to lock the slider in the second position.

20. A mechanical interlock for a switch of a switchgear comprising:
 a base including a hole; and
 a slider including a locking finger, the slider being moveable relative to the base between a first position and a second position, the locking finger being configured to be disengaged with mechanical linkage of the switch when the slider is in the first position, the locking finger being configured to engage with mechanical linkage of the switch when the slider is in the second position to lock a position of the switch;
 wherein the mechanical interlock is configured such that a locking mechanism is prevented from engaging with the hole to lock the slider in the first position, and wherein the mechanical interlock is configured such that the locking mechanism is permitted to engage with the hole to lock the slider in the second position.

\* \* \* \* \*